United States Patent [19]

Rudolphy

[11] 4,139,500
[45] Feb. 13, 1979

[54] PRINTING INK BINDING AGENTS

[75] Inventor: Albert Rudolphy, Wiesbaden-Biebrich, Germany

[73] Assignee: Hoechst Aktiengesellschaft, Frankfurt, Fed. Rep. of Germany

[21] Appl. No.: 549,489

[22] Filed: Feb. 12, 1975

Related U.S. Application Data

[63] Continuation-in-part of Ser. No. 428,855, Dec. 27, 1973, abandoned.

[30] Foreign Application Priority Data

Feb. 12, 1974 [DE] Fed. Rep. of Germany ....... 2406555

[51] Int. Cl.$^2$ ...................... C08L 93/00; C08L 93/04; C08L 61/10; C08L 45/00
[52] U.S. Cl. ................. 260/19 UA; 260/20; 260/25; 260/845; 260/848
[58] Field of Search ............. 260/848, 25, 845, 27 BB, 260/19 UA

[56] References Cited

U.S. PATENT DOCUMENTS

| | | | |
|---|---|---|---|
| 2,163,637 | 6/1939 | Thomas | 260/848 |
| 2,439,824 | 4/1948 | Rostler et al. | 260/25 |
| 3,586,735 | 6/1971 | Giller et al. | 260/848 |
| 3,674,732 | 7/1972 | Pitzalis et al. | 260/25 |
| 3,860,670 | 1/1975 | Uhlemayr et al. | 260/848 |
| 3,880,788 | 4/1975 | Rudolphy | 260/25 |
| 3,887,641 | 6/1975 | Tsuchiya et al. | 260/845 |

Primary Examiner—John C. Bleutge
Attorney, Agent, or Firm—Littlepage, Quaintance, Murphy, Richardson and Webner

[57] ABSTRACT

A process for the preparation of a printing ink binder which comprises simultaneously reacting (1) at least one hydrocarbon resin containing a predominant number of units of cyclopentadiene or derivatives thereof and having a bromine in the range 50 to 200, (2) at least one phenol-aldehyde component selected from the group consisting of a phenol-aldehyde condensation product and precursors therefor, the phenol content of which component consists predominantly of at least one phenol substituted by a hydrocarbon group, and (3) a natural resin component selected from the group consisting of a natural resinic acid, an ester and a metal salt thereof, said reaction mixture being free from $\alpha,\beta$-olefinically unsaturated dicarboxylic acids or derivatives thereof and a printing ink composition containing said binder in combination with a pigment and a nonaqueous medium.

11 Claims, No Drawings

PRINTING INK BINDING AGENTS

CROSS REFERENCES TO RELATED APPLICATIONS

This application is a continuation-in-part application of U.S. patent application Ser. No. 428,855, filed Dec. 27, 1973, now abandoned.

This invention relates to a process for preparing binding agents for printing inks, in particular printing inks for off-set and letterpress printing.

It has been proposed to react maleic anhydride with hydrocarbon resins and to thenreact the adducts with compounds of metals from group II of the Periodic Table. Such resins do indeed show distinctly more favourable behaviour in intaglio printing than the starting products, but owing to their incompatibility with mineral oils rich in aliphatics they are ill-suited to letterpress printing and offset printing.

It has also been proposed to use adducts of maleic anhydride and hydrocarbon resins low in indene as binding agents. However these adducts while again having improved properties over the starting resins are only suitable for intaglio printing.

In the search for binding agents not only for toluene intaglio printing, but also for paints and offset printing inks, it has been suggested to modify hydrocarbon resins with phenol-formaldehyde condensation products, preferably also incorporating maleic anhydride. In order to obtain a binding agent which is compatible with mineral oils, the product must, according to the aforementioned process, be boiled with a quantity of a drying oil at least equal to the quantity of modified hydrocarbon resin. Such fatty binding agents are indeed suitable for the preparation of letterpress and offset printing inks but not for the known offset roller printing inks.

Binding agents prepared from hydrocarbon resins by reaction with tert.-butylphenol, diphenylolpropane, formaldehyde and oxalic acid as acid catalyst have also been described. These binding agents may be used in toluene intaglio printing inks and in offset printing inks providing they are sufficiently compatible with mineral oils which are rich in aliphatics. Offset roller printing inks prepared therefrom adhere more strongly to paper than many known printing inks consisting of modified natural resinic acids. However, if such fatty binding agents are highly cross-linked, they generally show a lack of compatibility with mineral oils rich in aliphatics.

According to the present invention we now provide a process for the preparation of a printing ink binding agent having a melting point of 130° to 225° C, preferably 145° to 200° C, for use in heat-drying printing inks which comprises simultaneously reacting (1) a hydrocarbon resin containing a predominant number of units of cyclopentadiene or derivatives thereof and having a bromine number in the range 50 to 200, preferably 80 to 160, (2) a phenol-aldehyde component comprising a phenol-aldeyhde condensation product or precursors therefor, the phenol content of which consists predominantly of at least one phenol substituted by a hydrocarbon group and (3) a natural resinic acid or an ester or metal salt thereof, said reaction mixture being free from $\alpha,\beta$-olefinically unsaturated dicarboxylic acids or derivatives thereof. At least one olefinically unsaturated monomer may advantageously also be incorporated. In general the binding agents prepared according to the invention not only melt at a relatively high temperature but in addition are also particularly compatible with aliphatic solvents, especially mineral oils rich in aliphatics. Compatible mixtures containing binder: solvent in ratios higher than 1 : 1, for example 1 : 2 and above have been obtained. Good compatibility with odourless mineral oils (which are acceptable from an environmental viewpoint) is particularly desirable for the preparation of printing varnishes. Owing to the good solvent compatibility of the products, printing varnishes with good flow properties can be produced, which are suitable, for example, in the manufacture of offset roller printing inks. Moreover the product are lighter in colour than would be expected.

The hydrocarbon resin used as starting resin is generally prepared by thermal polymerisation, and contains units of cyclopentadiene and derivatives thereof such as methyl-cyclopentadiene and dicyclopentadiene. The starting resins are generally synthesised from hydrocarbon fractions boiling in the range from 20° to 180°, preferably 30° to 165° C. The hydrocarbon fraction after synthesis of the starting resin often contains olefinically unsaturated monomers, for example propylene, butene, butadiene, pentene, isoprene, cyclopentene and cyclohexene, which may if desired, be incorporated into the binding agent. These monomers, however, should amount to at most 10% by weight referred to the starting hydrocarbon resin.

Natural resinic acids which may be used are for example colophony, tall oil resinic acid and wood resin. Natural resinic acids with a bromine number of 200 to 280, preferably at least 250, are preferred. They are generally used in amounts of from 3 to 300, preferably 40 to 100% by weight, based on the hydrocarbon resin. The properties of the reaction products according to the invention for example the viscosity and solubility, may be controlled by means of the choice and amount of natural resin used.

The natural resins may be used as such or in the form of their esters or resinates. The esters may be prepared, for example, by at least partial esterification with mono- and/or polyhydric alcohols with up to 12 C-atoms, preferably methanol, ethanol, propanol, the butanols, pentanols, hexanols, heptanols, octanols, nonanols, dodecanols, diols with 2 to 8 carbon atoms, such as ethanediol and the propane-, butane-, pentane- and hexane-diols, glycerol, trimethylolethane, trimethylolpropane and pentaerythritol. The metal resinates may be prepared for example by at least partial neutralisation under salt formation with compounds of metals of group II and/or III of the Periodic Table, e.g. the oxides, hydroxides, carbonates and acetates of zinc, calcium and/or magnesium. On the other hand, the acid groups of the natural resin in the binder may be subsequently reacted in known manner forming resinates and/or esters, but the first-mentioned possibility is preferred.

An important advantage of the co-use of natural resinic acid components is that carboxyl groups are introduced which during the reaction in the heat react with metal salts, for example a catalyst for the phenol-aldehyde condensation reaction, to form soluble metal resinates. Thus the presence of insoluble, detrimental salt-like components in the end products which would have to be removed, for example by washing, is avoided. The presence of natural resinic acids permits the use as phenol-aldehyde components of phenol resols which have not been neutralised and thus still contain catalyst, often in quantities up to 4.5% by weight based on the phenol content. In addition washing of the reaction product is also avoided and thus the production of large quantities of waste water detrimental to the environment is eliminated.

It is also possible to modify resols or their uncondensed components each being free from catalysts and eventually to esterify and/or neutralize the natural resin component.

It is further possible to carry out the reaction in the presence of an alcohol and thus to esterify at least some of the resin acid groups during the reaction. Alternatively the acid groups may be esterified and/or neutralised at a later stage.

The phenol-aldehyde component may be for example a novolak or resol which may be based on phenol, but in a minor amount, or the uncondensed components of such resins. The phenol component contains at least one phenol substituted by at least one hydrocarbon group, for example phenols substituted by alkyl groups containing 1 to 12 carbon atoms, or by aryl or aralkyl groups, such as the cresols (e.g. m-cresol), 1,3,5-xylenol, isopropyl-, p-tert.-butyl, amyl, octyl-, and nonylphenol, phenylphenol, cumylphenol and diphenylolpropane, phenols substituted by other carbocyclic groups such as those obtained by addition of olefinically unsaturated monomers such as styrene, α-methyl-styrene, α-chlorostyrene, vinyltoluene, or cyclopentadiene to phenols, in conventional manner, using acid catalysts. The phenol component advantageously contains a predominant proportion of alkyl or aralkylphenols, and thus the desired compatibility of the reaction products with aliphatic hydrocarbons is attained. The preferred resins are those made from bifunctional phenols, that is, phenols in which two of the three o- and p-positions to the phenolic hydroxyl group are free and reactive. Trifunctional and higher functional phenols or the phenol resins produced therefrom are generally used only together with bifunctional phenolic components. e.g. the above-named alkylphenols and/or the addition products of olefinically unsaturated monomers to the phenols. The at least tri- and higher functional phenols such as phenol, diphenylolpropane, are generally only used in quantities of at most 10, preferably up to 5 % by weight, based on the total quantity of phenols. By controlling the content of trifunctional phenols, the solubility of the end products, particularly in aliphatic hydrocarbons, can be controlled. On the other hand, by raising the trifunctional phenol content to 10 %, the solubility of the products in aromatic hydrocarbons can be increased.

The aldehyde components of the phenol-aldehyde component is preferably an aldehyde with 1 to 7 C-atoms, particularly formaldehyde in monomeric or polymeric form. Other aldehydes, such as acetaldehyde, butyraldehyde, isobutyraldehyde, benzaldehyde and furfural, may also be used. The molar ratio of phenol:aldehyde in the phenol aldehyde component (including condensed phenol and aldehyde) may vary within wide limits, e.g. 1: (0.9 to 3.5), preferably 1:(1 to 2.5). Any unreached aldehyde or phenol may be distilled off at the end of the reaction.

By the nature and quantity of the phenol-aldehyde components in the starting mixture, the viscosity of the end products can be conveniently controlled. The use of liquid resols is preferred. The phenol-aldehyde component may on the other hand comprise mixed condensates of various phenols or resols modified by reaction with unsaturated monomers, e.g. the afore-mentioned monomers, in which case, further modification of the starting resin or of the end product with olefinic monomers is no longer necessary, but is precluded. However, compatibility with aliphatic hydrocarbons is reduced by a higher proportion of added monomers. To guarantee adequate compatibility, the proportion of monomers added to the phenol resin is therefore preferably not more than 5% by weight. The phenol content of the binding agent prepared wherein the phenol is preferably present in a bound form in the phenol resin component is preferably from 25 to 300% more preferably up to 100% by weight, based on the starting hydrocarbon resin. Advantageously an alkylphenol-aldehyde component contains at least 25, preferably at least 75% by weight (referred to the total phenol content) of butylphenol. The embodiment has the advantage that especially high-melting products are obtained which are compatible with mineral oils rich in aliphatics for example in ratios of at least 1 : 1, and even 1 : 2.

According to the invention, phenol-aldehyde condensation products especially those of alkylphenols, are preferably reacted in amounts up to 100% by weight, based on the starting hydrocarbon resin. In this way, adequate solubility of the binding agents, in particular in aliphatic hydrocarbons, is ensured.

The reaction is preferably effected at elevated temperatures in a melt or in solution. Any olefinic monomer components may conveniently serve as solvent.

It is not absolutely necessary to effect the process according to the invention in the presence of a catalyst, but in general an alkaline catalyst is present for example one or more of the catalysts conventionally used in phenol resin technology such as, e.g. sodium, potassium, magnesium, calcium, barium and zinc hydroxides, and the oxides, carbonates and acetates of the aforementioned metals and especially of zinc, magnesium and calcium either alone or in admixture. The amount of catalyst used is generally up to one gram-equivalent per mol of phenol, in particular 0.1 to 4.5% preferably 0.2 to 4% by weight, based on the total phenol content. The presence of alkaline catalysts is also preferred in the embodiment of the process of the invention according to which a phenol-aldehyde condensation resin prepared by acid condensation is used and the reaction is then performed, e.g. in a direct process with the above mentioned alkaline catalyst.

It is also possible to use as the phenol-aldehyde component resols which are prepared in the presence of substantially larger amounts of catalyst, for example one gram-equivalent of potassium hydroxide per mol of phenol. However such resins should be neutralised after the condensation reaction and washed free of salt components. If large quantities of phenols in the form of alkylphenols and/or aralkylphenol-formaldehyde condensates or their precursors are used, then the reactivity of the phenol resins is generally suppressed e.g. by condensing with less than the usual amount of formaldehyde, in order to keep the viscosity of the products within certain limits.

Conveniently, the reaction is performed in the presence of a solvent. Suitable solvents include for example the olefinically unsaturated monomers remaining in the hydrocarbon fraction after the synthesis of the starting hydrocarbon resin. Other solvents, for example toluene, xylene, mixtures of aliphatic and/or aromatic hydrocarbons, e.g. in the form of mineral oils or fractions from the distillations of crude oil, may be used together with or instead of these unsaturated monomers. However, inert solvents are preferred. As a rule, the solvent is removed after reaction, conveniently by distillation. In many cases, however, it may be desirable to leave at least part of the solvent, particularly mineral oils rich in aliphatics —e.g. those boiling in the range 240° to 320° C. — in the products, in order to vary the melting point and viscosity of the resin product as desired. Thus the reaction product may be obtained in the form of a solid or liquid resin (resin-mineral oil varnish) or as a solution in mineral oil. On the other hand, it is also possible to dilute particularly high melting products of the invention after the reaction, e.g. with mineral oils rich in aliphatics, and thus obtain a lowering of the melting point and a reduction of viscosity.

The reaction is generally effected at normal pressure, and at temperatures from 100° to 270° C., preferably 120 to 260° C., usually at least 170° C., and especially at 200° to 220° C. The reaction may also be effected under increased or reduced pressure. Towards the end of the reaction, the temperature is generally raised to removed any solvent, e.g. the reaction mixture may be heated to 250° to 270° C.

The products prepared according to the invention are high-melting resins. They are compatible with mineral oils, generally in ratios of at least 1:1, and often above 1:2, but also release the components of these solvents quickly. The reaction products according to the invention have a melting range of 130° to 225° C., preferably 145° to 200° C. The viscosity of the products (in 50% toluene solution/20° C.) is generaly 100 to 600, preferably 150 to 300 cP, but may if required be above or below this range. Products having a melting point and viscosity within the given ranges are particularly adapted for use as printing ink binding agents. Also, products with an acid number of 10 to 40, preferably 20 to 35 behave particularly favourably.

Solutions of the products in mineral oils rich in aliphatics may be used as varnishes for the manufacture of paints and printing inks. For this purpose they are generally easily processed with alkyd resins, driers, such as naphthenates or octoates of cobalt, zinc, manganese and lead, and pigments, and optionally also withgenerally up to 1% by weight — of chelate-forming metal compounds, such as titanates and aluminium alcoholates, to form heat-drying printing inks in particular for offset roller printing but also for letterpress printing. These inks dry considerably faster and also dry at lower temperatures than the hitherto known binding agents for offset roller printing. The presence of chelate-forming metal compounds serves to control gel formation and thus also contributes to faster drying and a better stand on the paper.

For letterpress printing inks, the products are preferably modified either by chemical reaction or more conveniently by simple admixture with a large quantity of drying oils or alkyd resins or the like, in order to increase the fatty acid content so that oxidative drying proceeds better. For intaglio printing inks, particularly toluene intaglio printing inks, compatibility may, on the other hand, be limited as required by, for example, incorporating maleic anhydride or a higher proportion of at least trifunctional phenols, such as diphenylolpropane, phenolformaldehyde resols or phenol novoalks, or, by adding styrene or dicyclopentadiene. Limited compatibility may also be achieved by replacing part of the starting hydrocarbon resin containing cyclopentadiene units used by a conventional hydrocarbon resin from crude oil fractions.

In the following Examples which serve to illustrate the process according to the invention % are by weight. The viscosity measurements in cP were, unless otherwise stated, measured in 50% toluene solution at 20° C. The viscosity measurements in P were, unless otherwise stated, determined at 20° C. in 40% solutions in linseed oil and in two mineral oils with a boiling range of (A) 280° to 320° C. and (B) 240° to 270° C. The mineral oil B is richer in aromatics than mineral oil A. Moreover, the compatibility of the products with these mineral oils was ascertained. The melting points given in the Examples are in each case measured by the capillary method.

EXAMPLE 1

600g of colophony were mixed with 1200 g of a polymer prepared from cyclopentadiene monomer (bromine number of polymer 125; melting point 75° C; viscosity 9.9 cP; fully compatible with petroleum ether with a boiling range of 80° to 110° C.) and 1100 g of a resol modified with styrene prepared from 1800 g of p-tert.-butylphenol, 737 g of formaldehyde and 150 g of styrene at an elevated temperature in a 4 liter flask with a water separator and reflux cooler. The mixture was then heated for one hour at 200° C. and for a further hour at 250° C, the water formed being continuously removed and the solvent being recycled in. The presence in the reaction vessel was reduced to 50 mmHg and the mixture was heated for a further hour at 250° C.

Yield: 2479 g. Characteristics: melting point 169° C; acid number 30; viscosity in toluene 119 cP, in linseed oil 520 P, in mineral oil A 100 P, in mineral oil B 16 P; compatibility with both mineral oils: more than 1.2. The resin is suitable for use as a fast drying binding agent for offset roller printing.

EXAMPLE 2

300 g of colophony and 600 g of the hydrocarbon resin used in Example 1 were melted together and 300 g of p-tert.-butylphenol, 2 g of zinc acetate and 130 g of paraformaldehyde were added. The mixture was heated under reflux for 2 hours at 110° C. The reflux cooler was then replaced by a water separator. The mixture was heated for 1 hour at 200° C., the water formed being continuously removed. 45 g of glycerol were added and the mixture was heated at 250° C. for 4 hours, and then for a further hour at the same temperature under reduced pressure of 50 mmHg.

Yield: 1175 g. Characteristics: melting point 179° C; acid number 15; viscosity: in toluene 154 cP, in linseed oil 765 P, in mineral oil A 160 P, in mineral oil B 25 P; compatibility of the resin with both mineral oils 1:2.

EXAMPLE 3

600 g of wood resin, 600 g of the hydrocarbon resin as in Example 1 and 600 g of p-tert.-butylphenol were melted together and 4 g of zinc acetate, 35 g of pentaerythritol and 196 g of paragformaldehyde were added. The process was continued as in Example 2.

Yield 1179 g. Characteristics: melting point 165° C; acid number 42; viscosity: in toluene 150 cP, in linseed oil 422 P, in mineral oil A 135 P, in mineral oil B 20 P. The compatibility of the binding agent with the two mineral oils were greater than 1:2.

EXAMPLE 4

600 g of tall oil resinic acid and 900 g of the hydrocarbon resin used in Example 1 were melted together. 400 g of p-tert.-butyl-phenol, 4 g of zinc carbonate and 196 g of paraformaldehyde were then added and the mixture was heated under reflux for 4 hours. After replacement of the reflux cooler by a water separator, the mixture was heated at 250° C. for 2 hours, during which time 30 g of glycerol and 35 g of pentaerythritol were added. After heating for 3 hours at 250° C., the mixture was kept for 1 hour at 260° C. at a pressure of 50 mmHg.

Yield: 2105 g. Characteristics: melting point 168° C; acid number 22; viscosity: in toluene 125 cP, in linseed oil 300 P, in mineral oil A 20.5; compatibility with mineral oil A 1:2.5.

EXAMPLE 5

600 g of Portuguese colophony and 1200 g of the hydrocarbon resin used in Example 1 were melted together. 600 g of p-tert.-butylphenol, 100 g of xylene, 2 g of magnesium oxide and 260 g of paraformaldehyde were added and the mixture was heated under reflux for 4 hours. The reflux cooler was replaced by a water separator, and the mixture was first heated at 200° C. for 1 hour and then at 250° C. for 4 hours. It was then kept for a further hour at this temperature reducing the pressure down to 50 mmHg.

Yield: 2379 g. Characteristics: melting point 188° C; acid number 30; viscosity; in toluene 222 cP; in linseed oil 1320 P, in mineral oil A 43 P; compatibility with mineral oil 1:2.8.

The resin according to Examples 2 to 5 are suitable as fast drying binding agents for offset roller printing inks. If a hydrocarbon resin is used as starting material which contains, in addition to cyclopentadiene and/or its derivatives, 3% of styrene and 2% of vinyl toluene, there is obtained, under otherwise identical conditions, a product with a rather lower melting point but equally good printing properties.

EXAMPLE 6

A resin was prepared analogously to Example 5 except that, instead of magnesium oxide, 4 g of zinc carbonate were used.

Yield 2349 g. Characteristics: melting point 178° C; acid number 30; viscosity: in toluene 185 cP, in linseed oil 1420 P, in mineral oil A 440 P, in mineral oil B 34.5 P; compatibility with both mineral oils greater than 1:2.

The resin prepared above was diluted with 120 g of mineral oil A to yield a product with a mineral oil content of 5%. It had the following characteristics: melting point 148° C; acid number 29; viscosity: in toluene 103 cP, in linseed oil 346 P, in mineral oil A 100 P, in mineral oil B 15 P. The compatibility of this product with the two mineral oils was greater than 1:5.

EXAMPLE 7

1000 g of the hydrocarbon resin used in Example 1, 50 g of Protuguese colophony and 300 g of p-tert.-butylphenol were melted together, and 12 g of calcium acetate and 150 g of xylene were added. After the addition of 100 g of paraformaldehyde, the mixture was heated under reflux for 4 hours at 120° C., and then at 250° C. for 3 hours using a water separator. The mixture was kept at this temperature for 3 hours at normal pressure and then for a further hour reducing the the pressure to 400 mmHg.

Yield: 1260 g. Characteristics: melting point 203° C; viscosity: in toluene 167 cP, in linseed oil 1630 P in mineral oil A 96 P, in mineral oil B 21.6 P; compatibility with the two mineral oils greater than 1:2.

EXAMPLE 8

A resin was prepared analogously to Example 7 but using 3 g of magnesium oxide instead of 12 g of calcium acetate. A resin with similar good properties for use as a fast-drying binding agent was obtained.

Yield: 1236 g. Characteristics: melting point 201° C; acid number 8; viscosity: in toluene 159 cP, in linseed oil 806 P, in mineral oil A 130 P, in mineral oil B 24.4 P; compatibility with the two mineral oils greater than 1:2.

EXAMPLE 9

A resin was prepared analogously to Example 7 but using 13 g of zinc acetate instead of 12 g of calcium acetate. A resin with similar good properties for use as a fast-drying binding agent was obtained.

Yield: 1301 g. Characteristics: melting point 199° C; acid number 10; viscosity: in toluene 194 cP, in linseed oil 1130 P, in mineral oil A 179 P, in mineral oil B 22.7 P; compatibility with both mineral oils greater than 1:2.

EXAMPLE 10

240 g of colophony and 480 g of the hydrocarbon resin used in Example 1 were melted together. 50 g of xylene, 100 g of nonylphenol, 28 g of paraformaldehyde and 398 g of a resol prepared by base catalysed alkaline condensation of 1800 g of p-tert.-butylphenol and 674 g of formaldehyde (dry residue 71.5% for 1 hour/135° C.) are added. The mixture was kept at 250° C. for 3 hours the water formed being continuously removed and then for a further hour at this temperature reducing the pressure to 450 mmHg.

Yield: 1076 g. Characteristics: melting point 172° C; acid number 34; viscosity: in toluene 192 cP, in linseed oil 1030 P, in mineral oil A 183 P, in mineral oil B 40.7 P; compatibility with both mineral oils greater than 1:3.

EXAMPLE 11

300 g of Chinese colophony and 600 g of a polymer from cyclopentadiene monomer (bromine number 140; melting point 44° C; viscosity 6.9 cP) were melted together. 300 g of p-tert.-butylphenol, 50 g of xylene, 140 g of paraformaldehyde and 2 g of zinc carbonate were added and the mixture was heated under reflux for 4 hours, and then at 250° C. with continuous removal of the water formed. The mixture was kept at this temperature for a further hour reducing the pressure to 50 mmHg.

Yield: 1179 g. Characteristics: melting point 170° C; acid number 34; viscosity: in toluene 160 cP, in linseed oil 869 P, in mineral oil A 592 P, in mineral oil B 61.5 P; compatibility with both mineral oils greater than 1:2.

EXAMPLE 12

A resin was prepared analogously to Example 11 but using a hydrocarbon resin with bromine number 136, melting point 59° C. and viscosity 8.2 cP.

Yield: 1161 g. Characteristics: melting point 174° C; acid number 35; viscosity: in toluene 156 cP, in linseed oil 865 P, in mineral oil A 304 P, in mineral oil B 42 P; compatibility with both mineral oils greater than 1:2.

EXAMPLE 13

600 g of colophony were added to 1200 g of a molten cyclopentadiene polymer (melting point 129° C., viscosity 28.6 cP). A water separator was used when the temperature reached 180° C. 215 g of xylene and subsequently 975 g of a resol consisting of 1200 g of p-tert.- butylphenol, 880 g of nonylphenol and 719 g of formaldehyde (processing viscosity 2460 cP, dry residue 70.2%/1h/135° C) were added. The mixture was heated to 250° C, the water formed being continuously removed. The temperature was then held at 250° C and the pressure was reduced to 50 mmHg, the volatile components being thus distilled off.

Yield: 2426 g. Characteristics: melting point 177° C; acid number 32.5; viscosity: in toluene 550 cP, in linseed oil 6730 P, in mineral oil A 1410 P, in mineral oil B 125 P; compatibility with both mineral oils 1:2. The resins prepared in Examples 10 to 13 are suitable as binding agents for fast drying offset roller printing inks.

EXAMPLE 14

A resol was prepared from 1500 g of p-tert.-butylphenol, 440 g of nonylphenol and 719 g of formaldehyde (dry residue 67.4%/1 h/135° C), and was reacted with 600 g of colophony at 150° C while the water formed was continuously removed. At 160° C, 1200 g of the hydrocarbon resin used in Example 1 and 50 g of xylene were added. The mixture was heated at 250° C for 2 hours and then for a further 40 minutes at this temperature reducing the pressure to 50 mmHg.

Yield: 2378 g. Characteristics: melting point 188° C; acid number 25.7; viscosity: in toluene 321 cP, in linseed oil 1520 P, in mineral oil A 435 P, in mineral oil B 51 P; compatibility with both mineral oils greater than 1:2.

EXAMPLE 15

240 g of Portuguese colophony and 27 g of mineral oil A were heated to 200° C and 480 g of the hydrocarbon resin used in Example 1 were added thereto. 410 g of a resol (dry residue 70%/1 h/135° C) prepared by base catalysed condensation of 1800 g of p-tert.-butylphenol and 710 g of formaldehyde were then added to the melt at 160/170° C. The mixture was finally heated at 250° C for 3 hours.

Yield: 1053 g. Characteristics: melting point 168° C; acid number 27; viscosity: in toluene 177 cP; in linseed oil 825 P, in mineral oil A 239 P; in mineral oil B 28.7 P; compatibility with both oils greater than 1:2.

The products of Examples 14 and 15 were suitable for use as binding agents for fast drying offset roller printing inks.

EXAMPLE 16

100 g of Portuguese colophony and 500 g of the hydrocarbon resin used in Example 1 were melted together. 400 g of resol prepared by alkaline condensation of p-tert.-butylphenol and formaldehyde in a mol ratio of 1:1.3 dry residue 63.7%/1 h/135° C.) were added to the mixture at 180° C. The mixture was heated to 250° C., the water formed being removed, and after 3 hours the volatile components were removed at 250° C. under reducing pressure, until a pressure of 50 mmHg was attained.

Yield 859 g. Characteristics: melting point 179° C; acid number 22.4; viscosity: in toluene 135 cP, in linseed oil 531 P, 45% solution in mineral oil (boiling range 240° to 270° C., deodorised, lower aromatics content than mineral oil A) 485 P; compatibility with this mineral oil 1:3.

The product was suitable for use as a binding agent for offset roller printing inks, or as a correcting resin for highly viscous binding agents to lower the viscosity of printing varnishes prepared therefrom.

EXAMPLE 17

600 g of p-tert.-butylphenol, 600 g of colophony, 60 g of glycerol and 600 g of the hydrocarbon resin used in Example 1 were melted together and 4 g of zinc carbonate were added. The mixture was condensed with 178 g of paraformaldehyde by heating under reflux. The cooler was then removed and the mixture was heated at 250° C. for 4 hours. The pressure was then allowed to fall to 50 mmHg, while holding the temperature at 250° C.

Yield: 1832 g. Characteristics: melting point 174° C; acid number 30; viscosity: in toluene 169 cP, in linseed oil 650 P, in mineral oil A (33.3%) 70.5 P; compatibility with mineral oil A 1:2.4; compatibility with petroleum ether (boiling point 80/110° C.) 1:3.9. The resin may be used with good results as a binding agent for both offset roller printing and for letterpress printing and offset block printing.

In the following printing ink tests, the suitability of the resins according to the present invention as binding agents for offset roller printing inks is compared with that of known binding agents. In particular the drying speeds of the inks under the influence of heat were compared.

PREPARATION OF THE PRINTING INKS

Varnishes were prepared from 40% by weight of resin according to Examples 1 to 15 and 60% by weight of mineral 60% by weight of mineral oil, and were adjusted either by further dilution with mineral oil or by using correspondingly larger quantities of resin, to an overflow time of 260 to 300 seconds at 20° C. in a 4 mm DIN cup. A quantity of each mixture which contained 10g of solid resin was mixed with 1 g of linseed oil, 0.15 g of polyethylene wax, 1.825 g of a commercial organic dye ["Hostapermblau"(registered Trade Mark of Hoechst Aktiengesellschaft)B 3 G] and 0.125 g of driers (mixture of cobalt octoate and manganese octoate). Offset roller printing inks were then prepared by passing the mixture six times over a triple roller.

PRINTING TESTS 0.1 g of each of 4 printing inks was applied to a sheet of coated paper weighing 120g/m$^2$. The inks to be tested were applied at separations of 15 mm with a 12 mm diameter steel rod. Immediately after the inks had been applied to the paper base, the paper was suspended vertically in a drying chamber heated with a blow torch to 150° C. and was then removed after 10 seconds. The paper was covered with a clean DIN A5 sheet of the same paper and was weighted down with a pressure of 45 kg/cm$^2$ above each strip of ink by means of a block testing apparatus developed by (Epprecht). If the ink was completely dry, no imprint was left on the upper sheet of paper and the test was designated the figure 0. If the ink was still very tacky and therefore a large amount of ink was transferred to the upper sheet of paper, the test was designated 5. Intermediate stages of the drying process were accorded figures between 0 and 5, the lower numbers indicating more complete drying. The test described was performed in similar manner four times in all with each ink, each time the drying time being increased by 5 seconds. Thus each ink was tested after having been dried at 150° C. for 10, 15, 20 and 25 seconds respectively.

For comparison purposes, the same test was conducted with the following three commercial resins used as binding agents for offset roller printing.

*Control resin A* is a phenol resin modified by natural resin. Characteristics: melting point/capillary method 155° C., acid number 17, viscosity 150 cP.

*Control resin B* is a resin prepared from dimerised colophony by reacting with phenol-formaldehyde condensation products and with $\alpha, \beta$-unsaturated dicarboxylic acids and polyhydric alcohols. Characteristics: melting point 164° C., acid number 30, viscosity 190 cP.

*Control resin C* is a high-melting polymer resin from cyclopentadiene. Characteristics: melting point 190° C., acid number 0, viscosity 85 cP. The results of the tests are assembled in the following Table I which lists
(1) the outflow viscosity of the varnish ink/mineral oil
(2) the quantity of each varnish having an outflow time in a 4 mm DIN cup in the range 260–300 seconds, which contains 10g of solid resin, and
(3) the drying rates of the inks applied.

Addition of the four drying figures for each ink tested gives a total figure which may be used to compare the drying properties of the inks. The lower the total, the faster is the drying of the ink at 150° C.

Table 1

| Example | varnish outflow time in sec/20° | quantity of varnish containing 10 g solid resin | heat drying of inks at 150° C | | | | total of Columns 4–7 |
|---|---|---|---|---|---|---|---|
| | | | 10" | 15" | 20" | 25" | |
| INVENTION | | | | | | | |
| 1 | 300 | 25 | 5 | 2 | 1 | 0 | 8 |
| 2 | 303 | 25 | 5 | 2 | 1 | 0 | 8 |
| 3 | 290 | 27.9 | 3 | 1 | 0 | 0 | 4 |
| 4 | 280 | 27.2 | 3 | 1 | 0 | 0 | 4 |
| 5 | 308 | 26.1 | 3 | 1 | 0 | 0 | 4 |
| 6 | 288 | 26.7 | 4 | 2 | 0 | 0 | 6 |
| 7 | 288 | 25.99 | 5 | 2 | 2 | 0 | 9 |
| 8 | 300 | 25.3 | 4 | 1 | 0 | 0 | 5 |
| 9 | 280 | 25.5 | 5 | 1 | 0 | 0 | 6 |
| 10 | 302 | 26.3 | 5 | 2 | 2 | 0 | 9 |
| 11 | 300 | 26.3 | 4 | 4 | 0 | 0 | 8 |
| 12 | 284 | 26.0 | 4 | 0 | 0 | 0 | 4 |
| 13 | 304 | 28.6 | 5 | 1 | 0 | 0 | 6 |
| 14 | 300 | 26.7 | 5 | 2 | 0 | 0 | 7 |
| 15 | 270 | 26.5 | 3 | 1 | 1 | 0 | 5 |
| COMPARISON | | | | | | | |
| resin A | 312 | 26.5 | 4 | 4 | 2 | 0 | 10 |
| resin B | 284 | 25 | 5 | 5 | 1 | 0 | 11 |
| resin C | 297 | 20.2 | 5 | 5 | 4 | 0 | 14 |

DISCUSSION OF THE RESULTS

As Table 1 shows, the inks made from the binding agents according to Examples 1 to 15 dry considerably faster than inks made from known binding agents A, B and C. In Table 2, the results of comparison tests for resins which were diluted with mineral oil A are given.

Table 2

| Example | varnish outflow time in sec/20° C | quantity of varnish containing 10 g of solid resin | heat drying of inks at 150° C | | | | Total of columns 4–7 |
|---|---|---|---|---|---|---|---|
| | | | 10" | 15" | 20" | 25" | |
| 4 | 265 | 31.5 | 3 | 0 | 0 | 0 | 3 |
| resin A (comparison) | 303 | 31.5 | 4 | 2 | 0 | 0 | 6 |

Table 2, above, shows that the ink prepared from the resin according to Example 4 dries considerably faster than the ink made from binding agent A.

The suitability of the resins according to the invention as binding agents for letterpress printing inks is compared with that of known binding agents in the following printing tests.

PREPARATION OF THE PRINTING INKS

Three printing inks were prepared containing three different varnishes prepared as follows:

From the resin obtained according to example 17 two printing varnishes have been prepared. For the preparation of varnish 1 a fatty printing ink alkyd resin is dissolved together with the binder and reacted with aluminium butylate. For the preparation of printing varnish 2 it is processed according to varnish 1, but half of the alkyd resin is substituted by linseed oil.

The base for the binder for the comparison test is the known resin A which is obtained as varnish 3 according to the process for the preparation of varnish 1.

Varnish 1

150 g of an isophthalic acid alkyd resin (linseed oil content 80.3%, viscosity (undiluted) 3900 cP, acid number 7) were heated to 250° C. and 400 g of the resin prepared according to Example 17 were added. When the resin had melted the mixture was cooled to 200° C. and mixed with 0.5% by weight of aluminum butylate. The mixture was heated at 200° C. for 90 minutes and then the highly volatile components of the mixture were removed at reduced pressure. The mixture was diluted with mineral oil A to yield a varnish with a 40% solids content.

Varnish 2

A resin mixture was prepared analogously to that used as Varnish 1 except that 75 g of the alkyd resin content was replaced by 75 g of linseed oil.

Varnish 3

A resin mixture was prepared analogous to that used as Varnish 1 except that resin A was used instead of the resin prepared in Example 17.

In each case 86 g of the printing varnish containing 40% resin were mixed with 22 g of permanent red (FRR-Hoechst) by 6 passages through a triple roller. Afterwards 5 g of each mixture were mixed on an Engelsmann friction plate for equal lengths of time with 0.3 g of driers (a 1:1 mixture of cobalt octoate and manganese octoate).

The inks were printed on to coated paper (120 g/m$^2$). The properties of the varnishes and the printing inks produced therefrom can be seen from Table 3.

TABLE 3

| Varnish | 1 | 2 | 3 |
|---|---|---|---|
| Viscosity of the Letterpress printing varnish | | | |
| Ubbelohde method 20° C. cP | 7000 | 3120 | 6900 |
| Rheological properties of the inks | | | |
| Viscosity P 20° C. Laray/Fallstab method | 1180 | 725 | 1050 |
| Degree of tack at 30° C./Tack-o-Scope | | | |
| 50 min | 121 | 111 | 115 |
| 200 min. | 135 | 123 | 130 |
| 350 min. | 144 | 130 | 138 |
| Printing properties (Dorner test apparatus) | | | |
| Weight of ink/mg. | 240 | 230 | 240 |
| Ink given off 1. pressure/mg | 13.5 | 13.8 | 13.5 |
| 2. pressure/mg | 12.2 | 13.0 | 12.3 |
| Gloss according to Lange after 24 hrs. | 28 | 34 | 24 |
| Penetration test* | 2.0 | 2.0 | 2.3 |
| Scouring test* | 2.1 | 2.1 | 2.2 |

*The figure 0 represents the best, and the figure 5 the worst in the penetration and scouring tests.

Discussion of the results

The gloss and penetration resistance of the inks made with printing varnishes 1 and 2 according to the invention were better than the gloss and penetration resistance of the ink made with the known varnish 3, although half the alkyd resin content of varnish 2 was replaced by linseed oil. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for the preparation of a printing ink binder which comprises simultaneously reacting (1) at least one hydrocarbon resin containing a predominant number of units of cyclopentadiene or derivatives thereof and having a bromine number in the range 50 to 200, (2) at least one phenol-aldehyde component selected from the group consisting of a phenol-aldehyde condensation product and precursors therefor, the phenol content of which component consists predominantly of at least one phenol substituted by a hydrocarbon group, and (3) a natural resin component selected from the group consisting of a natural resinic acid an ester and a metal salt thereof, said reaction mixture being free from $\alpha,\beta$-olefinically unsaturated dicarboxylic acids or derivatives thereof.

2. A process as claimed in claim 1 wherein at least one olefinically unsaturated monomer is additionally reacted.

3. a process as claimed in claim 1 wherein the natural resin component (3) is selected from the group consisting of colophony, tall oil resinic acid and wood resin and wherein the hydrocarbon resin contains units of at least one unit selected from the group consisting of cyclopentadiene and methycyclopentadiene.

4. A process as claimed in claim 1 wherein the phenol content of the printing ink binding agent prepared is from 25 to 300% by weight referred to the hydrocarbon resin, wherein a phenol-aldehyde component containing a predominant amount of a phenol substituted by a radical selected from the group consisting of an alkyl group having 1 to 12 carbon atoms, an aryl group and an aralkyl group is reacted and wherein a phenol-aldehyde condensation product is reacted in an amount up to 100% by weight referred to the hydrocarbon resin.

5. A process as claimed in claim 1 wherein a phenol-aldehyde component containing at least 25% by weight of butylphenol, referred to the total phenol content is reacted.

6. A process as claimed in claim 1 wherein the molar ratio of phenol : aldehyde in the phenol-aldehyde component is 1 : (0.9 to 3.5).

7. A process as claimed in claim 1 wherein at least one natural resin component selected from the group consisting of a natural resinic acid being at least partially esterified with a mono- to tetrahydric alcohol containing 1 to 12 carbon atoms and a natural resinic acid being at least partially neutralized with a group I or II metal compound is reacted.

8. A process as claimed in claim 1 wherein the reaction is effected at a temperature from 100° to 270° C and wherein the reaction is effected in the presence of at least one substance selected from the group consisting of a solvent, of from 0.1 to 4.5% by weight referred to the phenol content of an alkaline catalyst and a combination of both.

9. A process as claimed in claim 1 for the preparation of a printing ink binder having a melting point of 130° to 225° C. which comprises simultaneously reacting (1) at least one hydrocarbon resin containing a predominant number of units of cyclopentadiene or derivatives thereof and having a bromine number in the range 50 to 200, (2) at least one phenol-aldehyde component selected from the group consisting of a phenol-aldehyde condensation product and precursors therefor, the phenol content of which component consists predominantly of at least one phenol substituted by a hydrocarbon group, and (3) a natural resin component selected from the group consisting of a natural resinic acid an ester and a metal salt thereof, said reaction mixture being free from $\alpha,\beta$-olefinically unsaturated dicarboxylic acids or derivatives thereof and wherein the phenol content of the printing ink binding agent prepared is from 25 to 300% by weight referred to the hydrocarbon resin, wherein a phenol-aldehyde condensation product is reacted in an amount up to 100% by weight referred to the hydrocarbon resin, the molar ratio of phenol : aldehyde in the phenol-aldehyde component being 1 : (0.9 to 3.5) and wherein the reaction is effected at a temperature from 100° to 270° C.

10. A printing ink composition which comprises a printing ink binder which is a reaction product of (1) at least one hydrocarbon resin containing a predominant number of units of cyclopentadiene or derivatives thereof and having a bromine number in the range 50 to 200, (2) at least one phenol-aldehyde component selected from the group consisting of a phenol-aldehyde condensation product and precursors therefor, the phenol content of which component consists predominantly of at least one phenol substituted by a hydrocarbon group, and (3) a natural resin component selected from the group consisting of a natural resinic acid, an ester and a metal salt thereof, said reaction mixture being free from α,β-olefinically unsaturated dicarboxylic acids or derivatives thereof, a pigment and a non-aqueous medium.

11. A composition as claimed in claim 10 which additionally contains at least one substance selected from the group consisting of a drying oil, an alkyd resin and a chelate-forming metal compound.

* * * * *